United States Patent [19]

Al-Fares

[11] Patent Number: 5,515,271
[45] Date of Patent: May 7, 1996

[54] APPARATUS AND METHOD FOR MAPPING LATERAL VARIATION OF SUBSURFACE IMPEDANCE

[75] Inventor: Mohammad H. Al-Fares, Dammam, Saudi Arabia

[73] Assignee: Saudi Arabian Oil Company, Dhahran, South Africa

[21] Appl. No.: 219,510

[22] Filed: Mar. 29, 1994

Related U.S. Application Data

[63] Continuation-in-part of Ser. No. 127,686, Sep. 27, 1993.
[51] Int. Cl.$^6$ .................................................. G06F 19/00
[52] U.S. Cl. .................................... 364/421; 364/422
[58] Field of Search .............................. 364/421, 422; 367/28, 29, 30, 70

[56] References Cited

U.S. PATENT DOCUMENTS 4,228,529  10/1980  Hsu et al. .............................. 367/70
4,293,933  10/1981  Park et al. ............................. 364/422
4,679,174  7/1987   Gelfand .................................. 364/73
5,001,677  3/1991   Masters ................................. 367/68

OTHER PUBLICATIONS

Russell, B., "Introduction to Seismic Inversion Methods", Society of Exploration Geophysicists (SEG), Course Notes Series, vol. 2, ISBN-0-931830-65-6 1988, part 12.

Primary Examiner—Donald E. McElheny, Jr.
Attorney, Agent, or Firm—Abelman, Frayne & Schwab

[57] ABSTRACT

A technique for mapping lateral impedance of a subsurface layer is disclosed. Amplitudes are selected along a lateral slice of seismic data and an impedance model that generates values which approximate the selected amplitudes is developed. The lateral impedance of the subsurface layer is determined from the model and is mapped laterally, to produce a visual representation of the lateral impedance.

37 Claims, 15 Drawing Sheets

APPARATUS AND METHOD FOR MAPPING LATERAL VARIATION OF SUBSURFACE IMPEDANCE

This is a continuation-in-part of copending application Ser. No. 08/127,686 filed on Sep. 27, 1993.

FIELD OF THE INVENTION

The present invention relates to mapping impedance of subsurface areas.

BACKGROUND OF THE INVENTION

There are many prior art techniques for determining and mapping impedance of subsurface areas. In most of these techniques a plurality of acoustic signal sources direct signals into the earth toward a common depth point (CDP). This process is known as "stacking". A portion of each signal is reflected back when it reaches an interface between two subsurface strata or layers of differing impedance. The signals that are reflected back are picked up by receivers at the surface and the amplitudes of those signals can be used to determine reflectivity or reflection coefficients at the interfaces between subsurface layers of differing impedance.

The time between transmission of the acoustic signals to reception of the reflected portion of the signals is called "two way" time. In seismic data charts amplitude of a received signal is plotted versus two way time. A single vertical signal line on a seismic chart is called a "trace." A trace is essentially one dimensional showing signal amplitudes or reflectivity data of a plurality of vertical layers at a single horizontal position. A trace can be in wavelet form which is a continuous function showing positive and negative amplitudes, or in spiked signal form. Because the reflectivity of an interface is related to the impedance of the two vertically adjacent layers which form the interface, knowing the impedance of one layer and the reflectivity of the interface allows one to calculate the impedance of the vertically adjacent layer. The process requires inversion of the reflectivity data. Prior art techniques need to perform a wavelet estimation, which means changing the continuous wave seismic data to spiked seismic data.

While most impedance mapping techniques use reflectivity data, these techniques differ in how they process these data.

One well known prior art approach for mapping impedance characteristics is called a "recursive" approach. In this approach the impedance characteristics at a particular horizontal position of one subsurface layer are determined from a received signal amplitude from the interface between two vertically adjacent layers and the knowledge of the impedance of one of the two layers. The impedance of the determined layer at the determined horizontal position is then used to calculate the impedance at the same horizontal position for a subsurface layer below, in the same manner. In order to obtain impedance data concerning a large lateral section, several traces are used.

Another approach which has been used to determine impedance characteristics is a trace by trace modelling approach. Such an approach is described in "Generalized Linear Inversion of Reflection Data", Cooke Geophysics, Vol 48, No 6, June 1983 (pp. 665–676). In this approach, an initial impedance model is provided for a particular trace, using for example well impedance data. That model is updated until the modelled seismic response is within a given error of the actual "trace" from reflected signals. After impedance characteristics for an entire trace have been determined, the next trace is modelled and updated to within an error of the actual seismic data.

Both recursive and "trace by trace" prior art modelling techniques can be said to map impedance vertically, trace by trace.

Some model based apparatus, such as SLIM (Seismic Lithologic Modeling) develop an initial model of multiple traces and then update these models. However, these multiple trace apparatus operate on an entire two-dimensional section of a plurality of subsurface layers.

In all model based apparatus, an initial model is provided then updated through multiple iterations, to reach a solution. Such iterative algorithms have to deal with convergence and nonuniqueness issues because of the non-linear nature of "inversion".

All prior art techniques whether recursive or modelling treat reflectivity in the vertical direction.

OBJECTS AND SUMMARY OF THE INVENTION

It is an object of the present invention to overcome shortcomings of the prior art of subsurface impedance mapping techniques.

It is a further object of the invention to provide accurate mapping of lateral variations in impedance of subsurface areas.

It is a further object of the invention to reduce the effect of noise on subsurface impedance mapping.

The present invention provides a method and apparatus for determining and mapping subsurface impedance in a lateral fashion. In one form of the invention impedance is mapped horizon by horizon and in another form time slice by time slice.

In one embodiment of the invention, lateral variations in reflectivity data along a horizon obtained from multiple signal traces are approximated using a set of basis functions. The basis functions are then used to calculate lateral variations in impedance for a particular subsurface layer.

In another form of the present invention lateral impedance of an unknown layer is determined in the following manner. First a lateral background impedance model, $I_0(x)$, is determined from impedance information from two or more spaced wells at a particular subsurface layer. For example if two well impedances are used, the impedance at one well at the desired layer may be $I_1$ and the impedance at the other well at the same layer may be $I_2$. The model $I_0(x)$ can be a simple straight line interpolation between the $I_1$ and $I_2$ values. Known impedance data other than well impedance data can also be used to determine a background impedance.

Next an estimate, $I_1(x)$, is made of the lateral impedance of the subsurface layer vertically adjacent the unknown layer. The lateral impedance of the adjacent layer can be determined from a conventional technique such as recursion or prior art modelling approaches.

A background reflectivity model, $r_0(x)$, is next mathematically determined from $I_0(x)$ and $I_1(x)$. Next, the received signal amplitudes, $r(x)$, for multiple traces along the desired target horizon are chosen. The difference is taken between the amplitudes of $r(x)$ and the background reflectivity model, $r_0(x)$, to form lateral variations in reflectivity, $\Delta r(x)$.

The data values $\Delta r(x)$ are then approximated by a factor times a mathematical model of lateral variation in impedance, $\Delta I(x)$, which is comprised of a set of basis functions.

The coefficients of the basis functions are solved in the approximation of $\Delta r(x)$. The coefficients and the basis functions, can then be used to determine the lateral variation in impedance, $\Delta I(x)$ values. Finally, the $\Delta I(x)$ values are added to the lateral background impedance values $I_0(x)$ to form the lateral impedance values, $I(x)$, of the unknown layer.

The present invention reduces the effect of noise on subsurface impedance mapping and allows impedance data to be presented in a more meaningful manner. The impedance characteristics of subsequent layers can be sequentially determined and mapped in a similar manner to map a two dimensional target zone. Although multiple iterations are required to determine the impedance of multiple layers, the impedance of one layer comprising multiple traces is determined in a single step. The present invention can also be applied to determine and map the impedance of three dimensional subsurface areas.

BRIEF DESCRIPTION OF THE DRAWINGS

Further features of the invention, its nature and various advantages will be more apparent from the drawings and the following detailed description of the invention, in which.

DETAILED DESCRIPTION OF THE INVENTION

Figure 1:
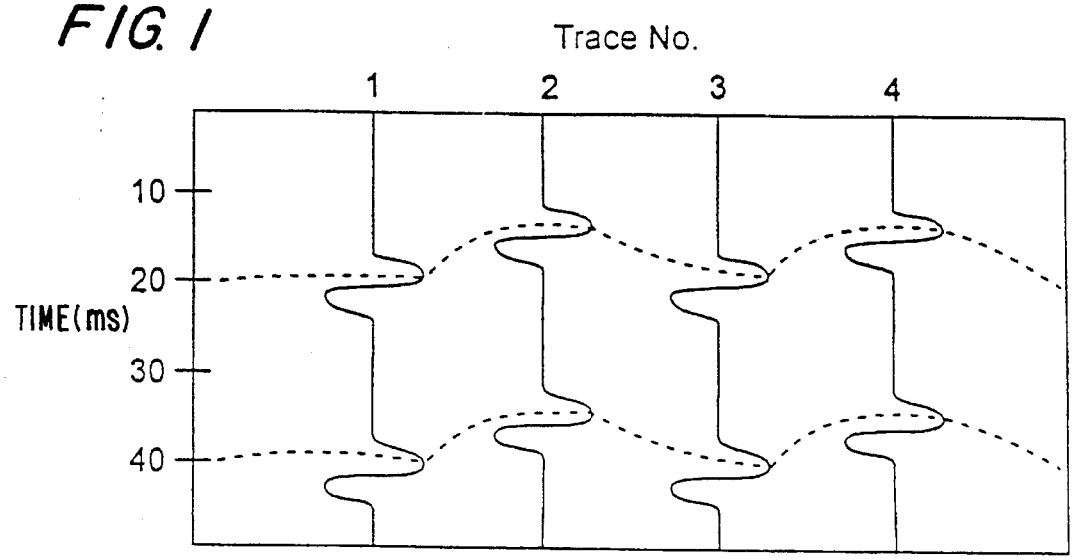
FIG. 1 shows a seismic data chart.

FIG. 1 shows a simplified diagram of a seismic data chart. The vertical axis shows "two way" times from transmission of an acoustic signal from a signal source or sources at the surface until it is reflected back to a receiver at the surface. The horizontal axis is labelled "Trace no." Each trace differs in that the signals are projected towards different common depth points which are spaced horizontally across the section. Thus, each trace gives essentially a one dimensional vertical indication of reflectivity data. The interfaces between layers of different impedances appear to occur at about 20 and 40 milliseconds, because that is where the highest reflected amplitudes are. The dashed curves shown connecting the peaks are referred to in the art as horizons. The horizon roughly indicates an interface between layers of differing impedance.

Prior art techniques operate on the signal amplitudes shown in FIG. 1 on a trace by trace basis. Recursive techniques in particular use signal amplitude and vertically adjacent layer impedance values to determine unknown layer impedances at a particular time region on a single trace. The determined impedance is next used with the signal amplitude data vertically below to determine the impedance of the next layer. The noise in reflectivity data from each interface is mapped into the corresponding determined impedance. After impedances at one horizontal or lateral position (i.e., for one trace) are determined the process is done for the next trace. In that sense a recursive type process of the prior art operates on a single trace at a time.

Figure 2:
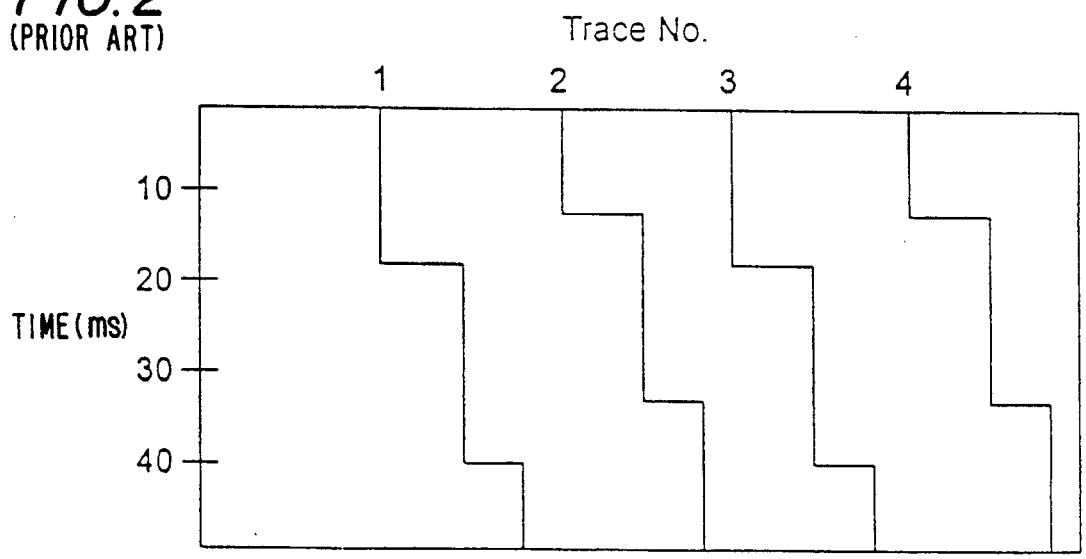
FIG. 2 illustrates an impedance chart derived from the seismic data in FIG. 1.

In a recursive approach, the received signal amplitudes are used to create an impedance chart per trace as shown in FIG. 2. The chart is not a very good indication of lateral variations in impedance which may exist within layers.

Figure 3:
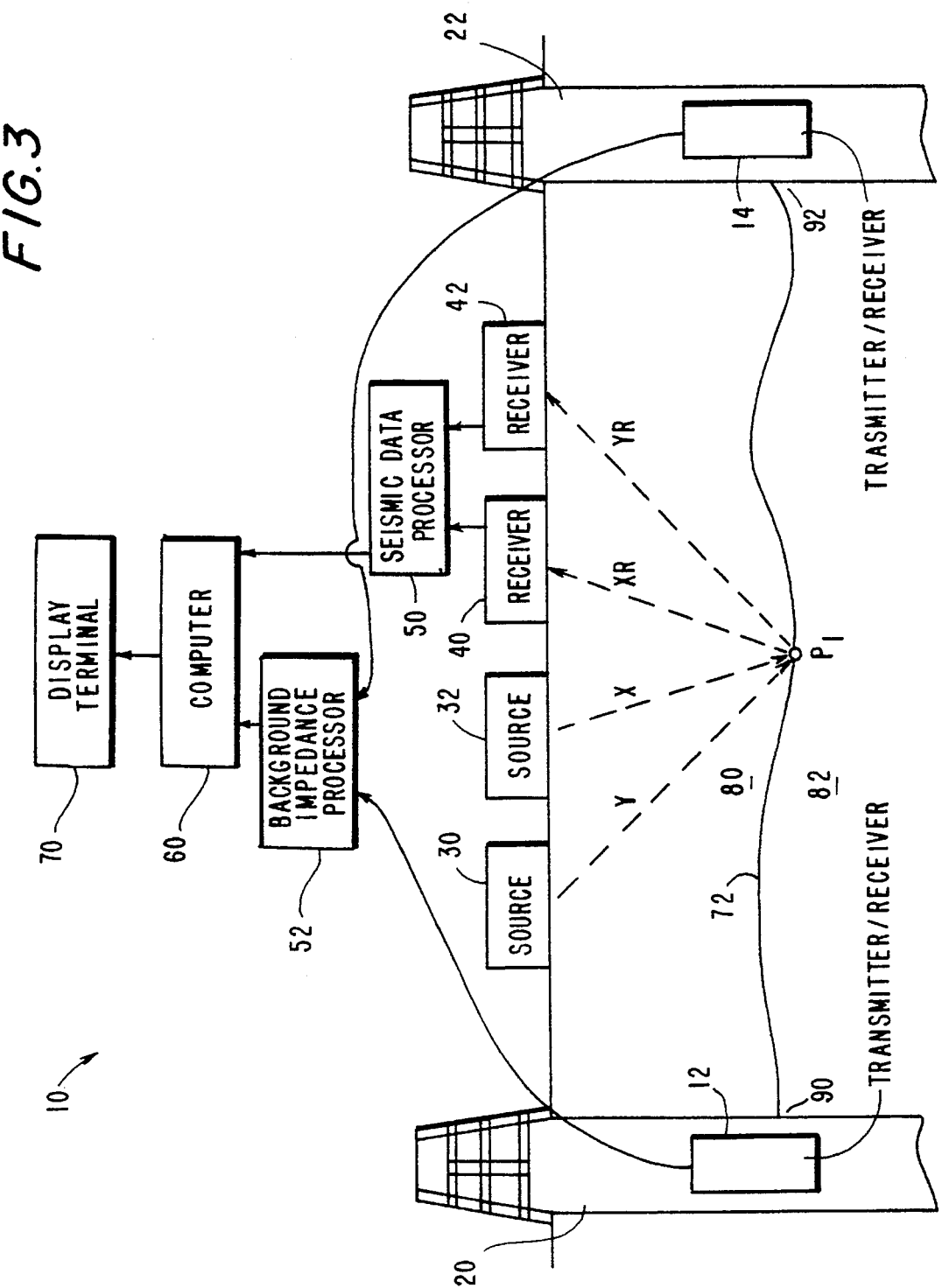
FIG. 3 shows an apparent horizon between two subsurface layers and a apparatus for mapping variation in lateral impedance.

The present invention will now be described with reference to FIGS. 1, 3, 4 and 5. FIG. 3 shows wells 20 and 22, target horizon 72, subsurface layers 80 and 82, and background impedance points 90 and 92. FIG. 3 also shows an apparatus 10 for mapping lateral impedance in accordance with the present invention. The apparatus 10 includes well transmitter and receiver sections 12 and 14, an array of surface signal sources which includes sources 30 and 32, an array of surface signal receivers which includes receivers 40 and 42, seismic data processor 50, background impedance processor 52, computer 60, and display terminal 70.

The transmitter portions of the well transmitter and receiver sections 12 and 14 transmit acoustic signals and the receiver portion of sections 12 and 14 receive reflected signals. The signals are processed by background impedance processor 52 to determine the lateral background impedance. Preferably impedance values at the two wells are interpolated to determine the lateral background impedance. Any number of well impedances can be used and their data can be interpolated point to point by line segments or by fitting a polynomial to several points. The lateral background impedance values are input to computer 60.

The array of surface signal sources transmit acoustic signals which reflect back from impedance interfaces, such as the apparent interface along horizon 72 and are received by the array of surface receivers. For example, the signal Y is transmitted from signal source 30, is reflected off common depth point P1 and the signal YR is received at receiver 42. The signal X is transmitted from signal source 32, reflected off common depth point P1 and the signal XR is received at the receiver 40.

The signals from the array of receivers, such as receivers 40 and 42, are combined and processed by seismic data processor 50 to form seismic data.

Computer 60 determines the lateral impedance of subsurface layer 82 from the lateral background impedance and the seismic data information. Other than the determination of lateral background impedance and the production of seismic data, the computer 60 in this embodiment performs the other tasks listed in the flow chart of FIG. 5, which will shortly be described. The lateral impedance of layer 82, determined by the computer is mapped out on display terminal 70. Display terminal 70 has a vertical axis which indicates "two way time" from transmission of signals to reception of signals and has a horizontal axis which indicates common depth point or horizontal location. Display terminal 70 preferably displays impedance variations in color.

Figure 4:
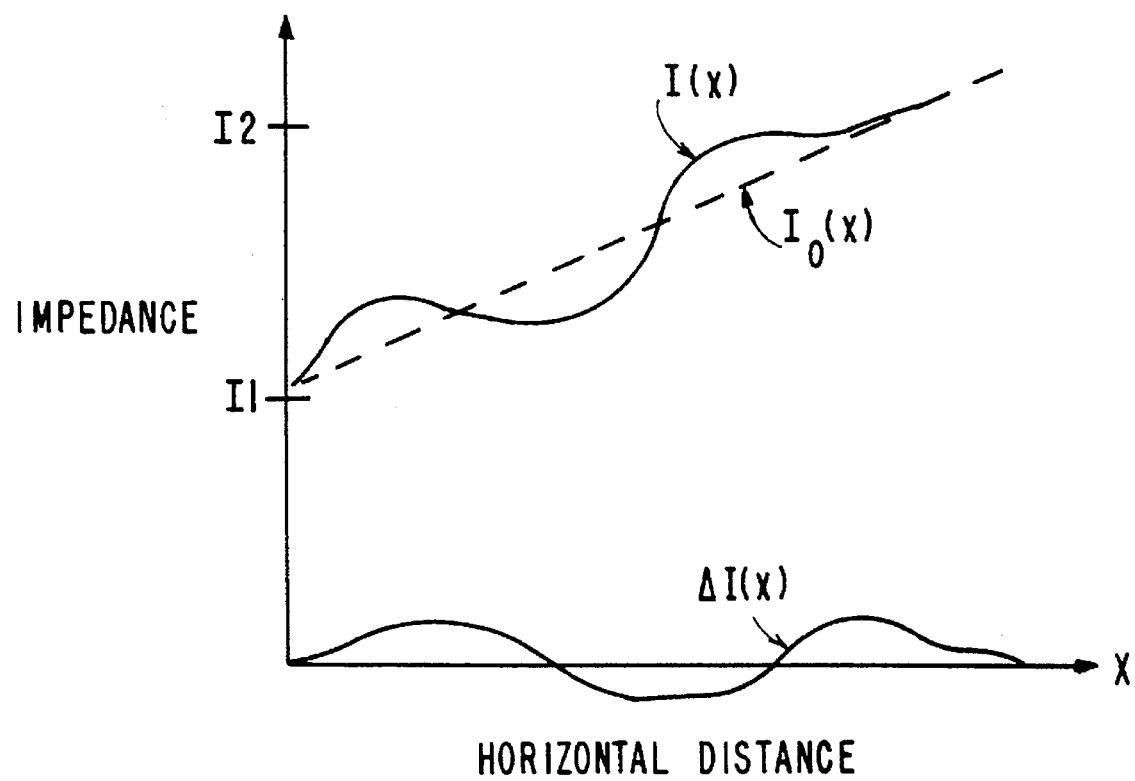
FIG. 4 illustrates an exemplary lateral background impedance, unknown layer lateral impedance, and a lateral difference impedance.

Referring to FIG. 4, the unknown lateral impedance, $I(x)$, of layer 82 is shown graphed versus horizontal distance. Also shown graphed is the lateral background impedance $I_0(x)$ which is the interpolation of impedances $I_1$ and $I_2$ at well points 90 and 92 respectively. Finally, the lateral difference impedance, $I(x) - I_0(x) = \Delta I(x)$ is also graphed on FIG. 4.

Figure 5:
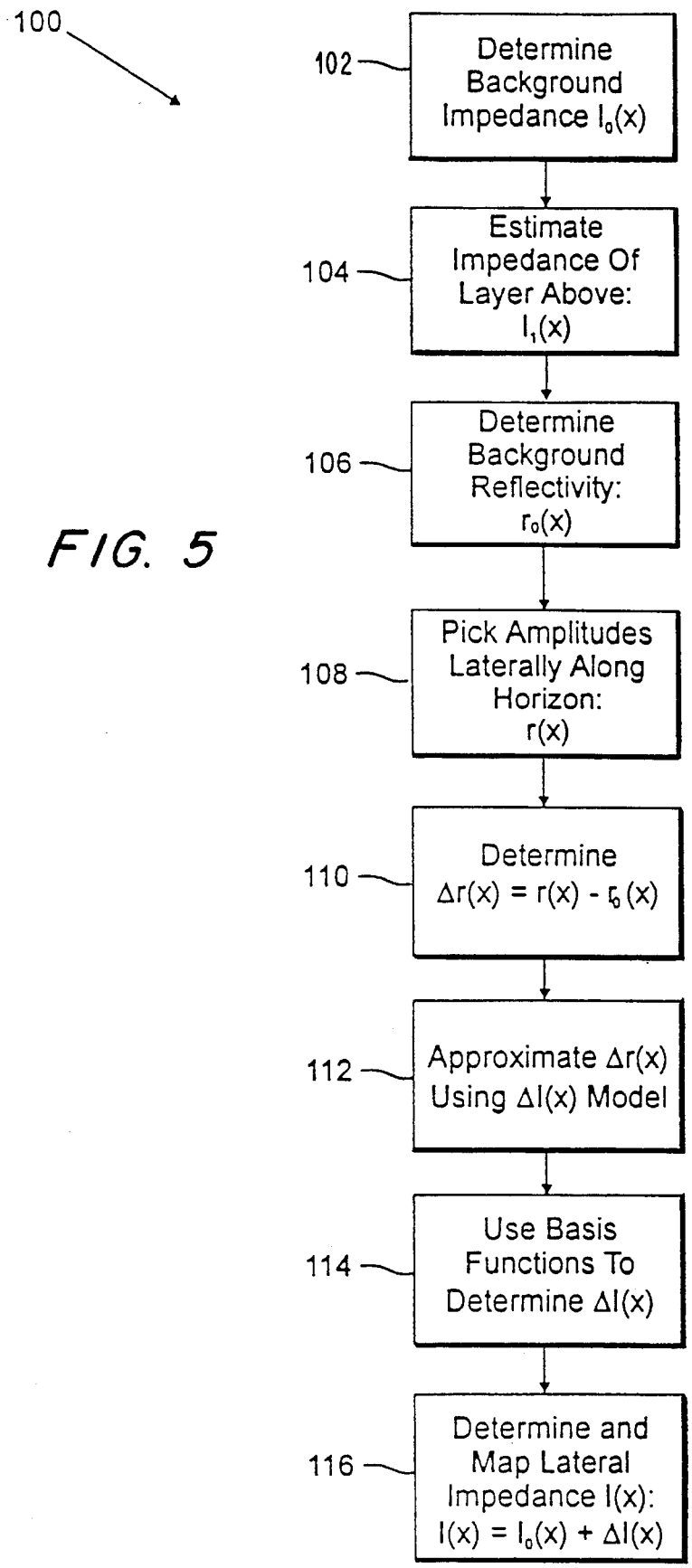
FIG. 5 is a flow chart of a method for determining and mapping lateral impedance in accordance with the present invention.

FIG. 5 shows a flow chart 100 for mapping lateral impedance of a subsurface layer in accordance with the present invention. The flow chart 100 will be described in conjunction with the apparatus 10 of FIG. 3 and the functions illustrated in FIG. 4. The steps can be summarized in the following manner. The unknown lateral impedance, $I(x)$, of layer 82 is determined from a lateral impedance estimate, $I_1(x)$ of layer 80, the received signal amplitudes from horizon 72, and the well impedances at points 90 and 92. The detailed explanation of flow chart 100 of FIG. 5 follows.

The lateral background impedance model $I_0(x)$ is first determined in block 102 by interpolating between the well impedances, $I_1$ and $I_2$, at points 90 and 92 respectively, to derive the function $I_0(x)$. Next, in block 104 an estimate is made of the lateral impedance, $I_1(x)$, of the layer 80 using a prior art recursive technique. A background reflectivity model, $r_0(x)$ is mathematically determined in block 106 from $I_0(x)$ and $I_1(x)$ by the following known formula:

$$r_0(x) = [I_0(x) - I_1(x)]/[I_0(x) + I_1(x)]$$

Next, in block 108, actual received signal amplitudes are selected laterally across the horizon 72 from actual seismic data values, $r(x)$. A geologist can perform the amplitude picking through computer 60 or the computer can pick amplitudes. Selecting amplitudes eliminates the wavelet estimation step required by prior art impedance mapping methods. The amplitudes picked can be positive, negative, or even zero and in this embodiment are only approximately chosen across the horizon 72 of peak response. In block 110, the difference is taken between each picked amplitude of $r(x)$, and the corresponding background reflectivity value of model, $r_0(x)$, to obtain the lateral variation in reflectivity values of $\Delta r(x)$. The values of $r(x)$ and $r_0(x)$ should be calibrated because the two measurements often differ by several orders of magnitude. The values of $r_0(x)$ should be between $-1$ and $1$ while the values for $r(x)$ may be of the order of thousands or millions.

The data values comprising $\Delta r(x)$ are then approximated, in block 112, by a $c(x)$ multiplied times a model for lateral variation in impedance comprising a series of basis functions and their coefficients, where $c(x)=[1-r_0(x)]/[I_0(x)+I_1(x)]$. The following formula is used:

$$\Delta r(x) \cong c(x) \sum_{\mu=1}^{2} \sum_{j=1}^{M} \gamma_j^\mu \Phi_j^\mu(x) \quad (1)$$

The $\gamma_j^\mu$'s are unknown coefficients which will be determined by the lateral approximation and modelling technique of the present invention The $\Phi_j^\mu(x)$'s are the basis functions, which for a two dimensional case preferably are $\sin(jx)$ for $\mu=1$ and $\cos(jx)$ for $\mu=2$. The equation is summed for $u=1$ to 2 and for $j=1$ to $M$ where $M$ determines the model size.

Equation (1) was derived in the following manner.

Along the target horizon:

$$\begin{aligned} r(x) &= [I(x) - I_1(x)]/[I(x) + I_1(x)] \\ &= [I_0(x) + \Delta I(x) - I_1(x)]/[I_0(x) + \Delta I(x) + I_1(x)] \end{aligned}$$

$$r(x) = [a(x) + \Delta I(x)]/[b(x) + \Delta I(x)],$$

where $a(x) = I_0(x) - I_1(x)$ δ $b(x) = I_0(x) + I_1(x)$ and both $a(x)$ δ $b(x)$ are known.

$$r(x) = 1 + \{[a(x)-b(x)]/b(x)\} \bullet \{1/[1+(\Delta I(x)/b(x))]\}$$

It is then assumed that the difference lateral impedance $\Delta I(X)$, is small compared with the lateral background impedance $(-1 \leq \Delta I(x)/b(x) \leq 1)$, and obtain:

$$\begin{aligned} r(x) &= 1 + \{[a(x) - b(x)]/b(x)\} \cdot \{1 - [\Delta I(x)/b(x)] + \\ &\quad [\Delta I(x)/b(x)]^2 - [\Delta I(x)/b(x)]^3 + \ldots \} \\ &\cong 1 + \{[a(x) - b(x)]/b(x)\} \cdot \{1 - [\Delta I(x)/b(x)]\} \end{aligned}$$

where only the first-order term is kept. The relative impedance change is modelled by a set of basis functions $\Phi_j^\mu(x)$:

$$\Delta I(x) = \sum_{\mu=1}^{2} \sum_{j=1}^{M} \gamma_j^\mu \Phi_j^\mu(x) \quad (2)$$

where ($\mu=1,2$ δ $j=1,2,\ldots,M$)

$$\begin{aligned} r(x) &\cong 1 + \{r_0(x) - 1\} \times \left\{ 1 - \left[ \sum_{\mu=1}^{2} \sum_{j=1}^{M} \gamma_j^\mu \Phi_j^\mu(x) \right] /b(x) \right\} \\ &\cong r_0(x) + c(x) \sum_{\mu=1}^{2} \sum_{j=1}^{M} \gamma_j^\mu \Phi_j^\mu(x) \end{aligned}$$

where $r_0(x) = a(x)/b(x)$ δ $c(x) = \{1 - r_0(x)\}/b(x)$. But since $r(x) = r_0(x) + \Delta r(x)$, we can write:

$$\Delta r(x) \cong c(x) \sum_{\mu=1}^{2} \sum_{j=1}^{M} \gamma_j^\mu \Phi_j^\mu(x) \quad (1)$$

The above formula is a linearized expression relating relative changes in reflectivity to a lateral difference impedance model characterized by its coefficients $\{\gamma_j^\mu\}$. The coefficients $\gamma_j^\mu$ are determined so that the least squares norm of the difference between the actual values of $\Delta r(x)$ and the approximation is minimized.

It is important that $-1 < \Delta I(x)/b(x) < 1$ since that assumption was made in the derivation of the approximation equation for $\Delta r(x)$. This can be checked by seeing that $r_0(x) - 1 < \Delta r(x) < 1 - r_0(x)$.

After the coefficients have been derived, the lateral difference impedance values, $\Delta I(x)$, are determined in block 114 of FIG. 5 by the formula previously shown:

$$\Delta I(x) = \sum_{\mu=1}^{2} \sum_{j=1}^{M} \gamma_j^\mu \Phi_j^\mu(x) \quad (2)$$

($\mu=1,2$ δ $j=1,2,\ldots M$)

$\Delta I(x)$ is added to the lateral background impedance model $I_0(x)$ in block 116 of FIG. 5 to form $I(x)$ which is the lateral impedance of the unknown layer. The lateral impedance is mapped.

Figure 6:
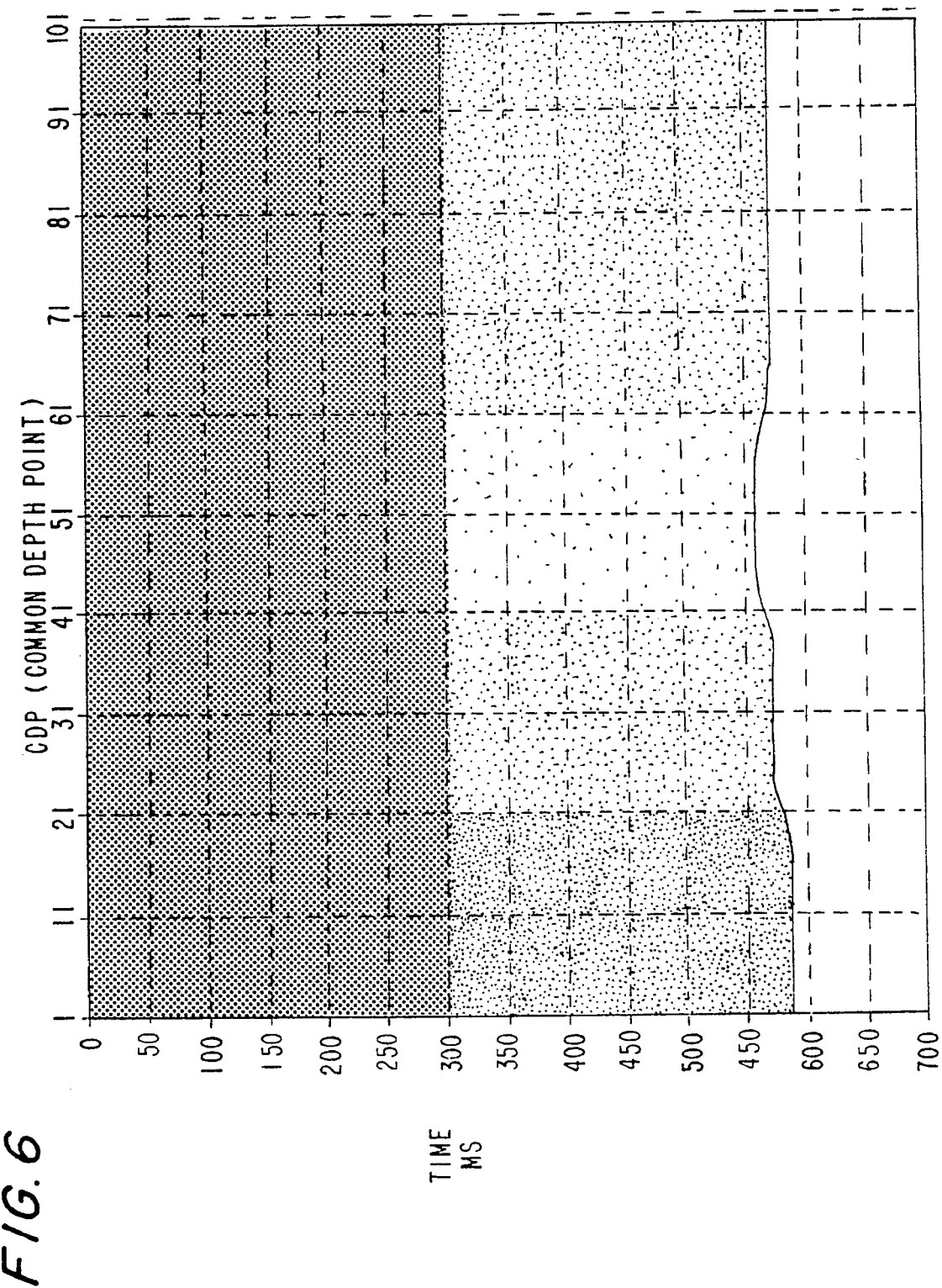
FIG. 6 illustrates a true impedance model.

Exemplary results of the mapping of lateral variations of impedance of the present invention for a single subsurface layer will now be shown by referring to FIGS. 6–9. These results are merely illustrative and do not represent actual results. FIG. 6 shows a hypothetical true impedance model of a subsurface layer. The dark areas are impedance levels of 2100 ft/sec×g/cm$^3$ while the light areas are impedance levels of 2200 ft/sec×g/cm$^3$. The gray areas are impedance levels between these values. The layer to be examined lies between 300 and 600 milliseconds. The impedance varies laterally, however, present methods do not adequately graph these lateral variations.

Figure 7:
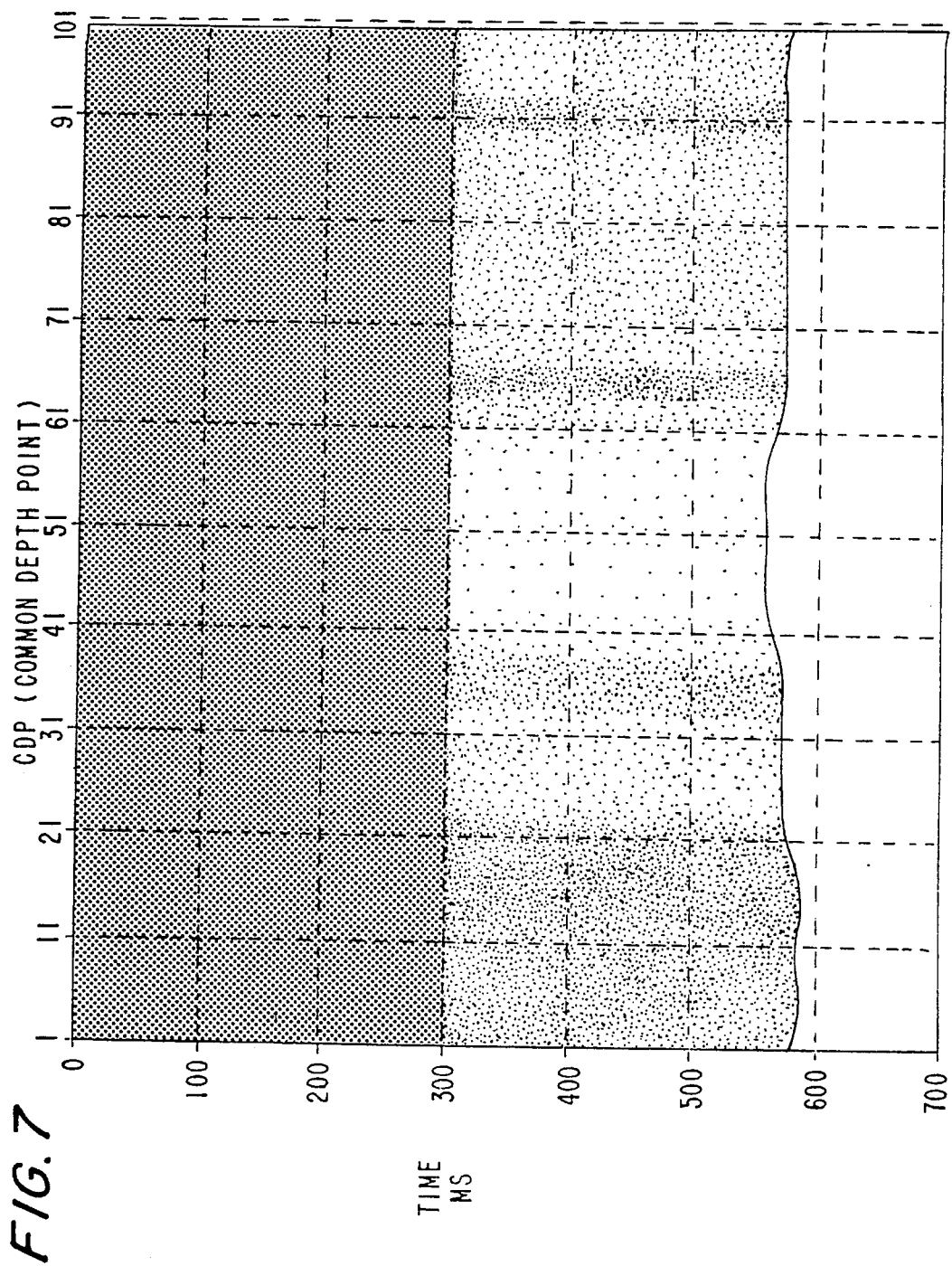
FIG. 7 illustrates mapped lateral impedance of a subsurface layer using M=10 for the model of the present invention.
Figure 8:
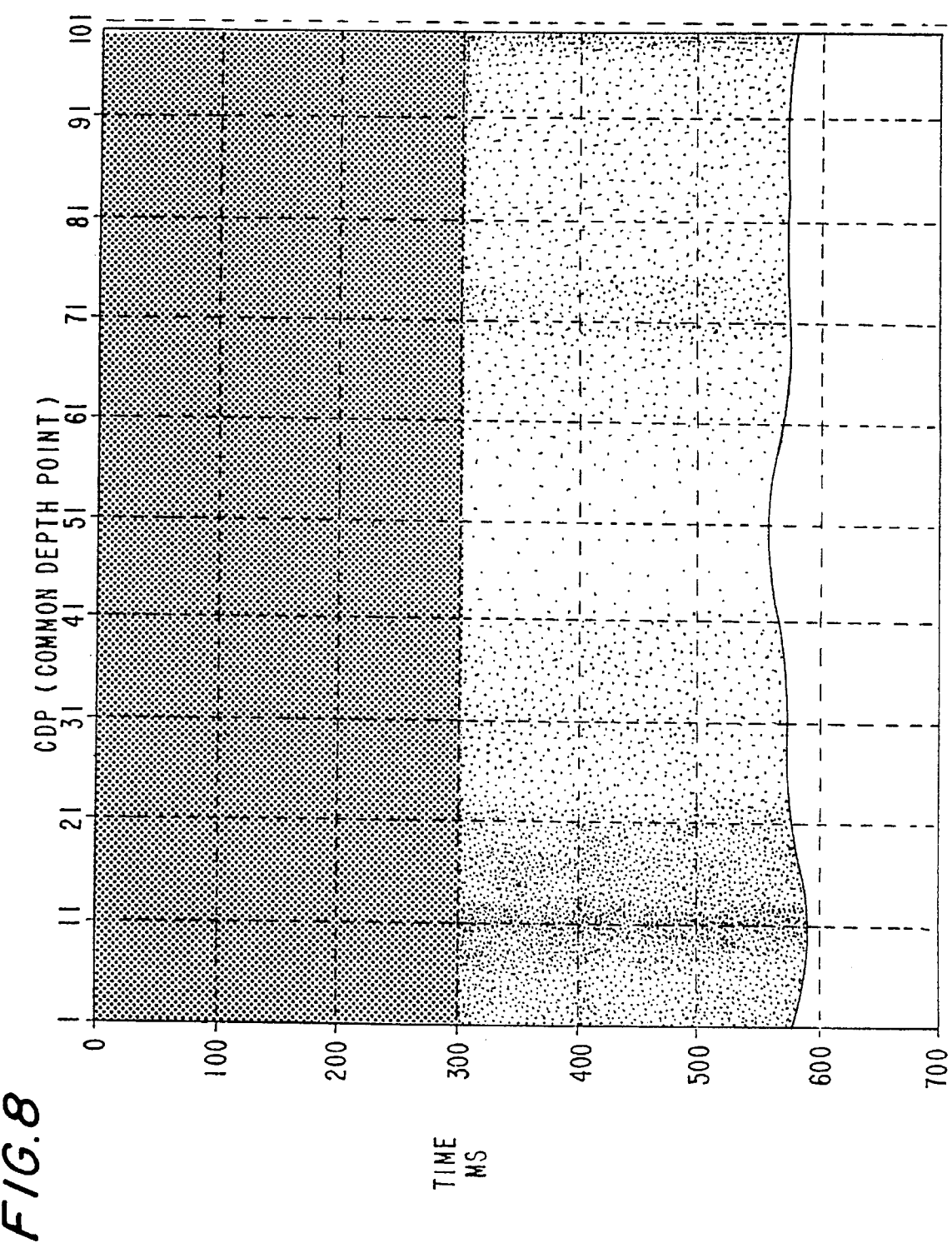
FIG. 8 illustrates mapped lateral impedance of a subsurface layer using M=5 for the model of the present invention.
Figure 9:
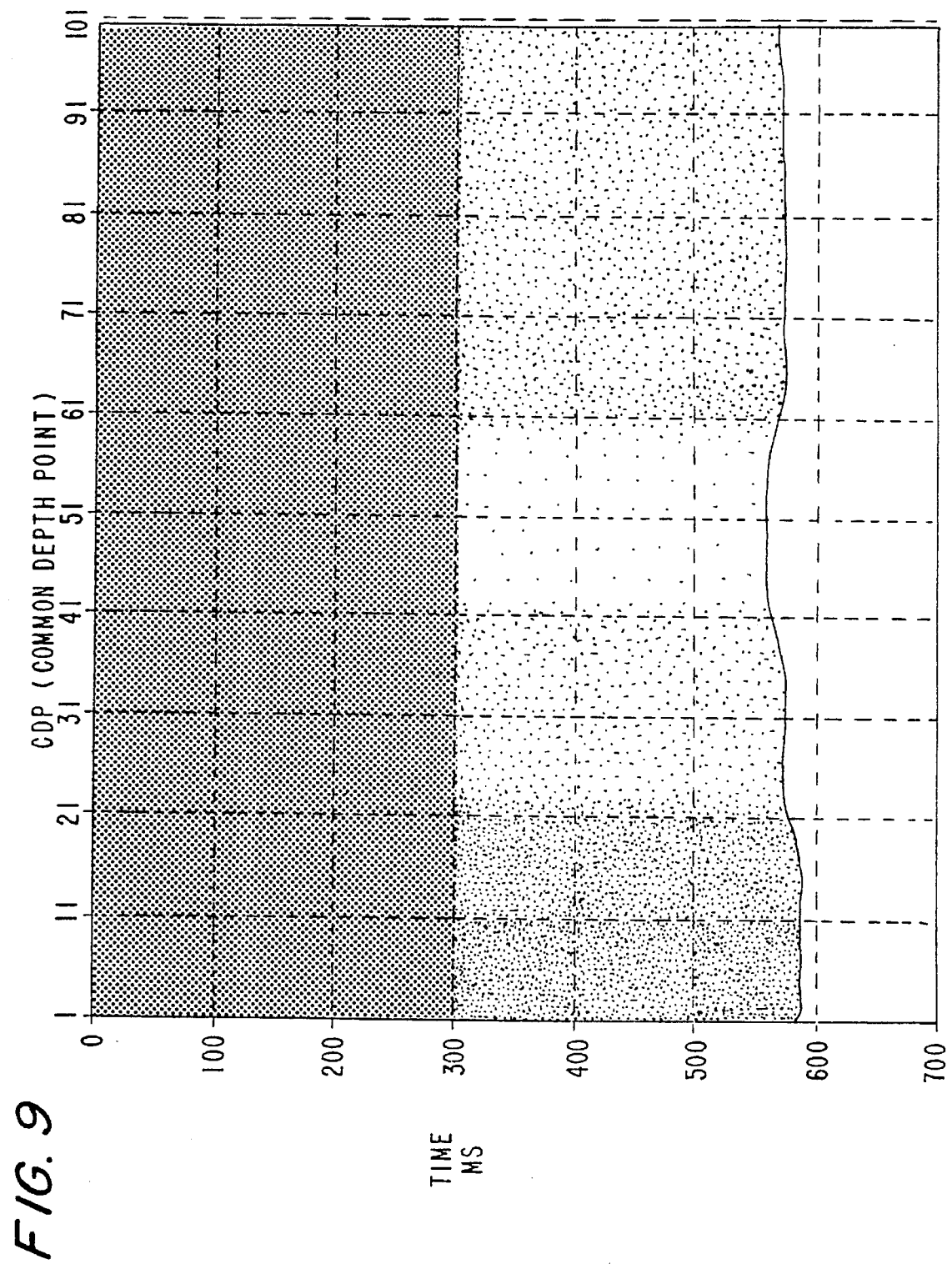
FIG. 9 illustrates mapped lateral impedance of a subsurface layer using M=25 for the model of the present invention.

FIG. 7 shows the impedance characteristics of the layer when determined by using the present invention. The solution shown is for M=10. A poorer solution is obtained for M=5 as shown in FIG. 8. A better solution is obtained for M=25 as shown in FIG. 9.

The size M of the model can be chosen by a geologist based on observation of the seismic data amplitude spatial spectrum. If the geologist believes that the higher frequency components are due to noise a lower M can be chosen to reduce the effect of noise on impedance mapping. If the geologist believes that the higher frequency components are due to actual variations in lateral impedance, a higher M can be chosen to model the higher frequency components.

Figure 10:
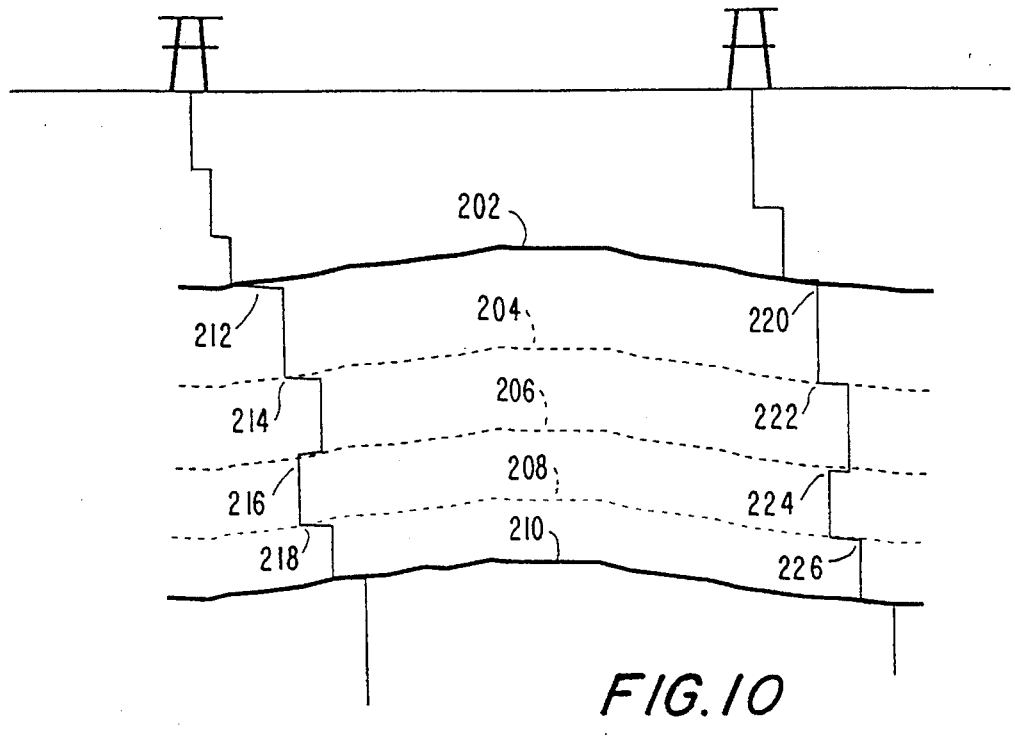
FIGS. 10 and 11 illustrate a multi-horizon approach for mapping impedance characteristics of a two-dimensional target zone of a plurality of subsurface layers.
Figure 11:
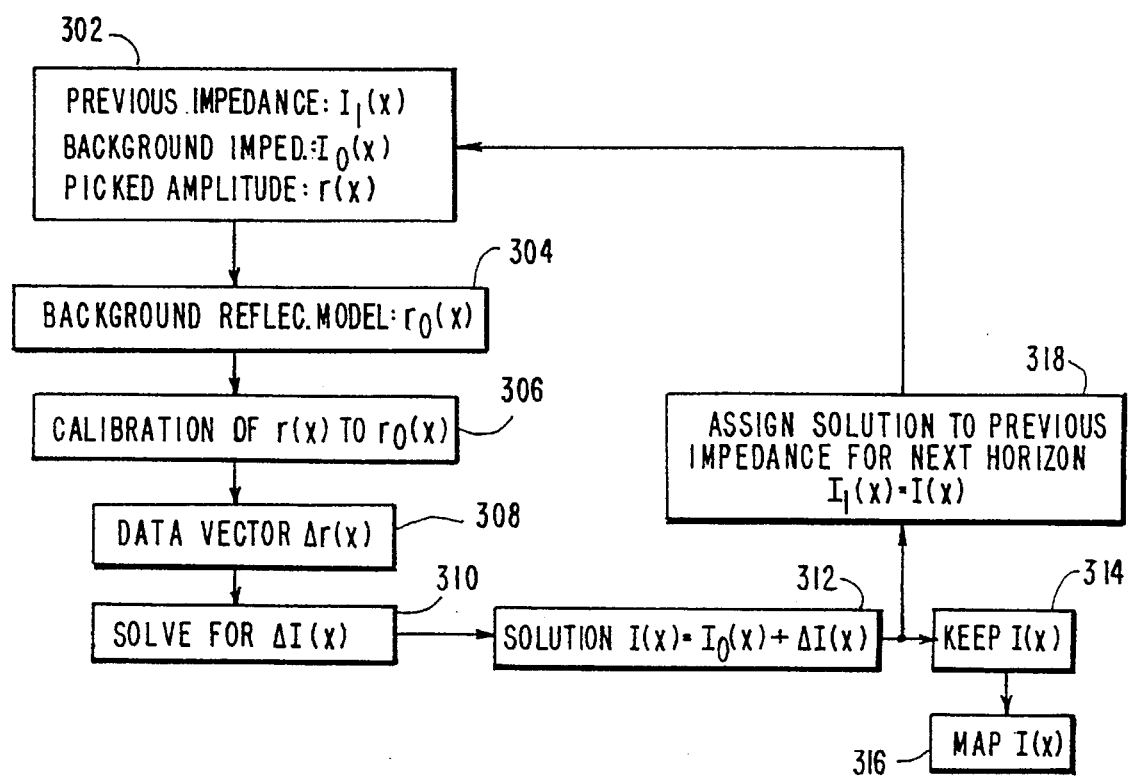
Figure 12:
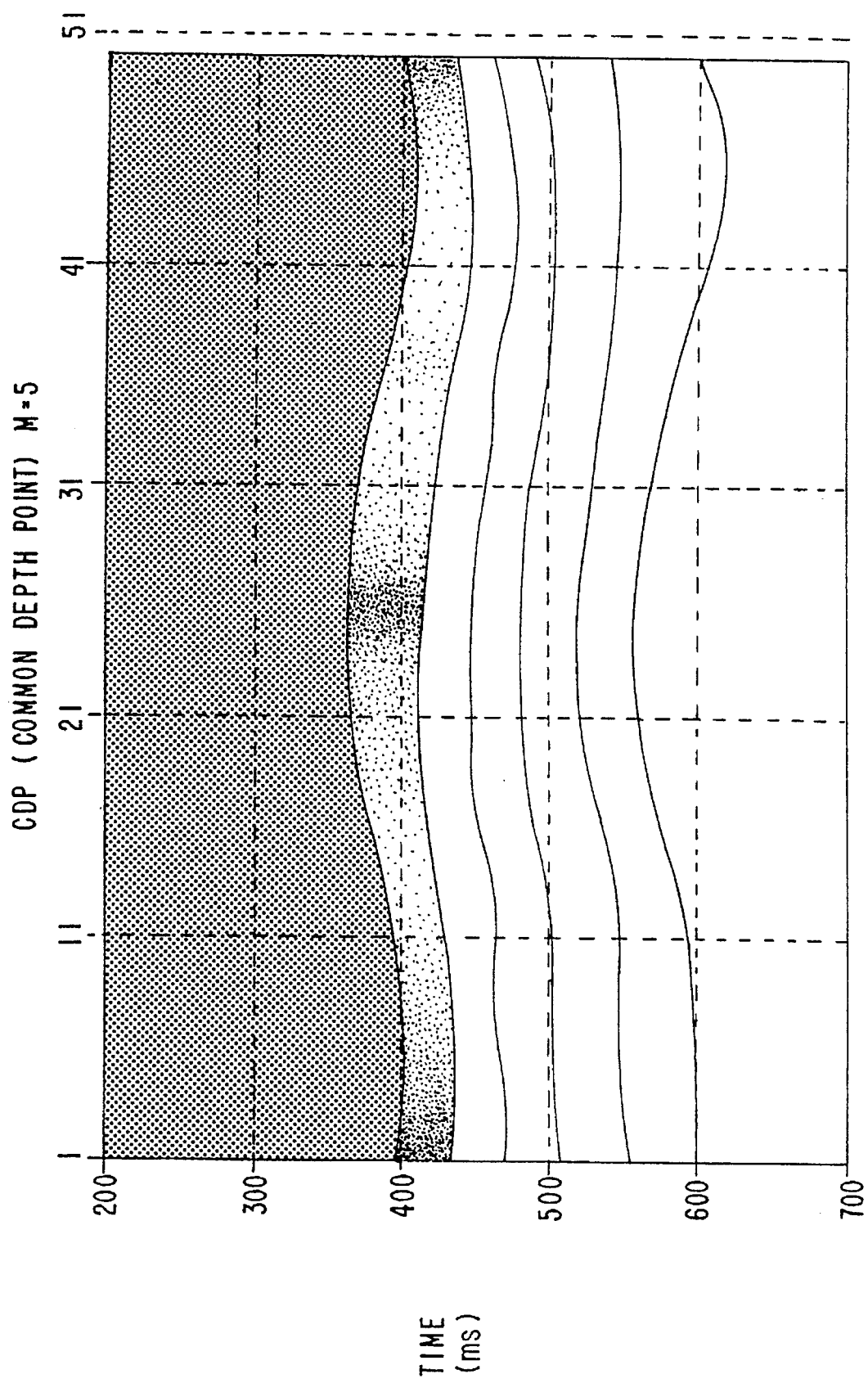
FIGS. 12–16 illustrate exemplary results of a multi-horizon approach for mapping a two-dimensional target zone of a plurality of subsurface layers.
Figure 13:
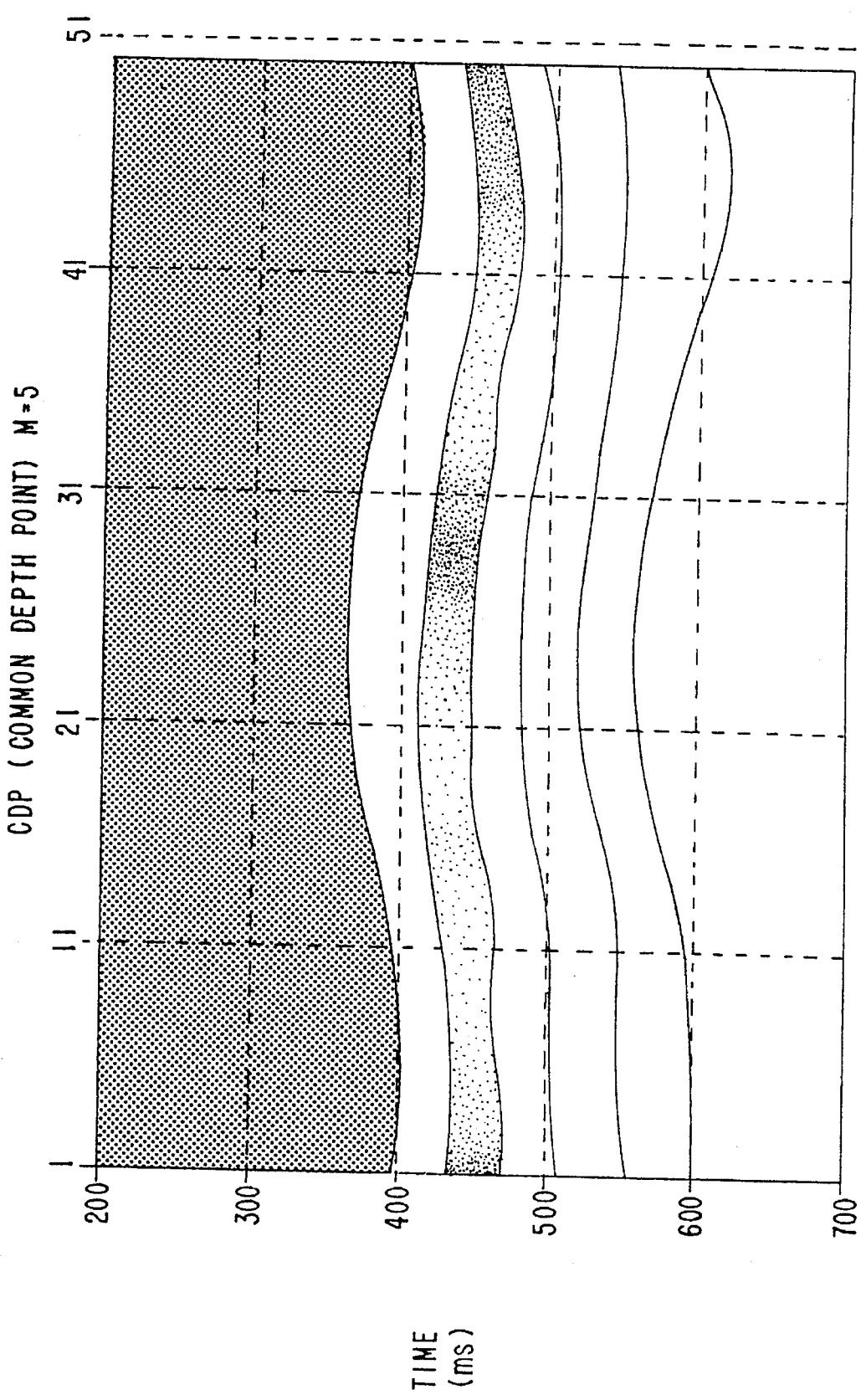
Figure 14:
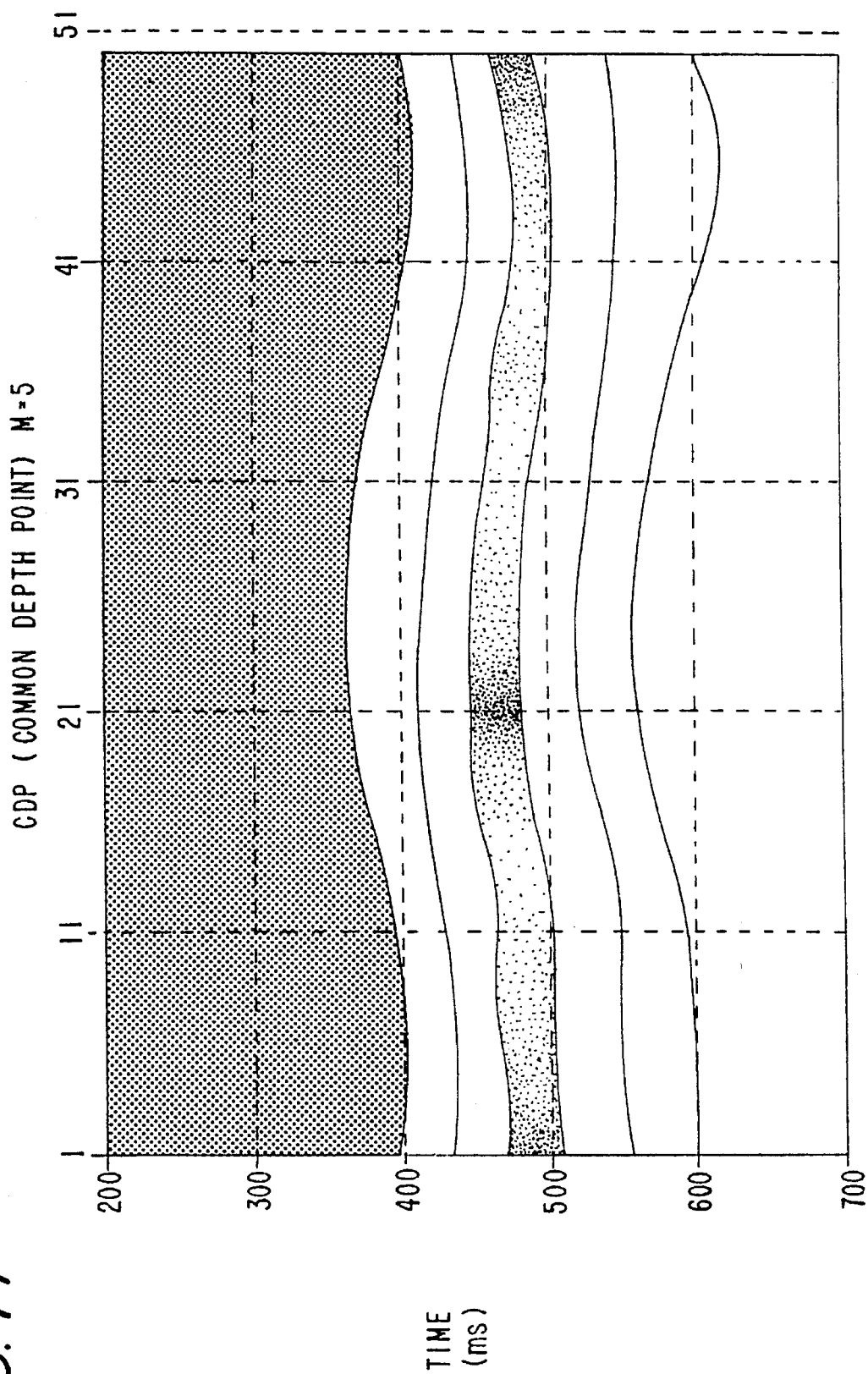
Figure 15:
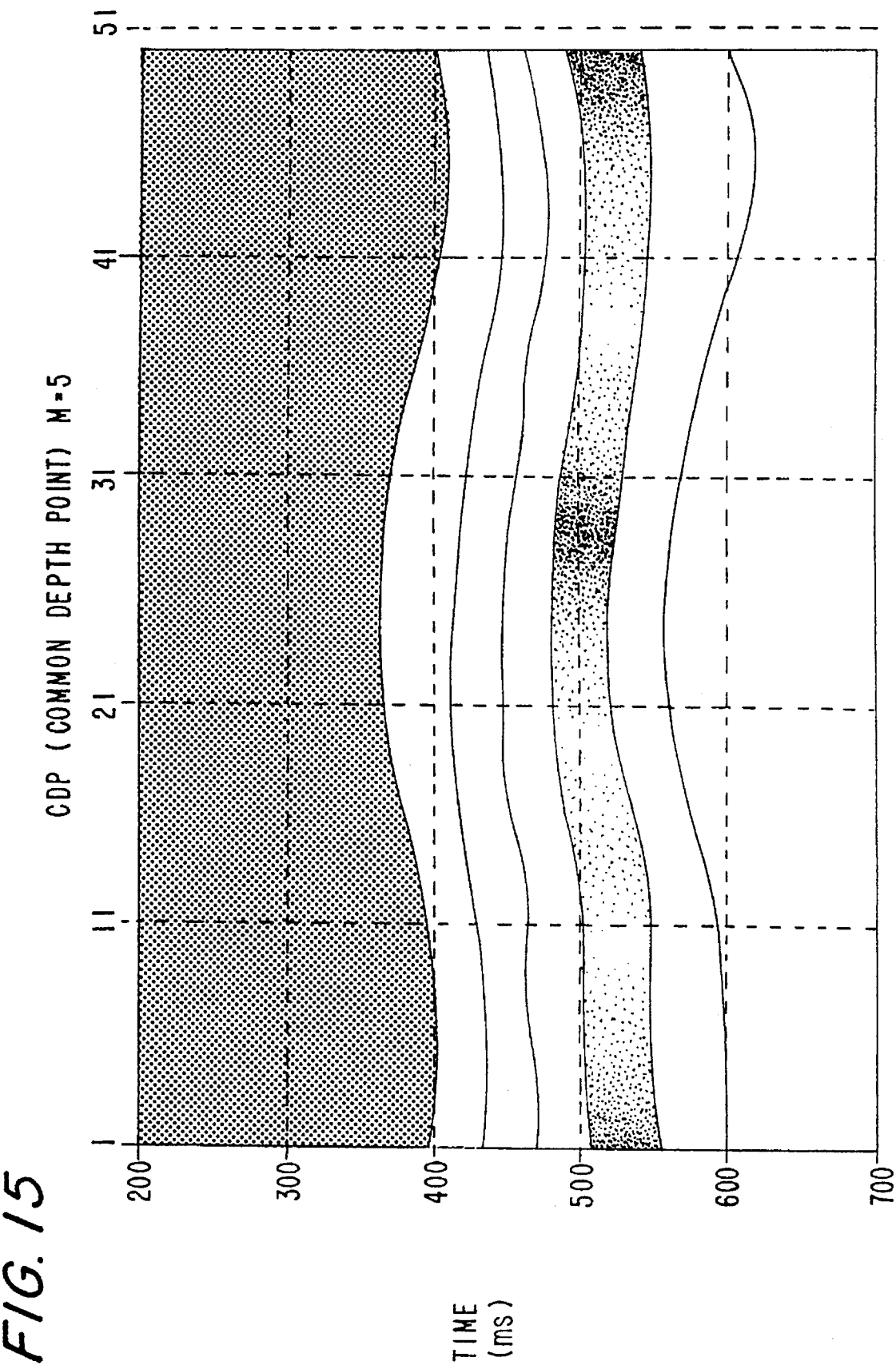

The impedance characteristics of multiple layers can be determined in a similar manner. FIGS. 10 and 11 demonstrate a multiple horizon approach to determining lateral impedance characteristics of a target zone of subsurface layers. FIG. 10 shows horizons 202, 204, 206, 208 and 210 and well points 212, 214, 216, 218, 220, 222, 224 and 226. FIG. 11 shows flow chart 300 with blocks 302, 304, 306, 308, 310, 312, 314, 316, and 318.

At each horizon, the estimated lateral impedance of the above layer, the lateral background impedance, and the picked amplitudes along the horizon for the unknown layer are obtained as shown in block 302 of FIG. 11. For example at horizon 202 the layer above horizon 202 and the impedances at well points 212 and 220 are used. The background impedances and the impedance of the above layer are used in block 304 to determine the background reflectivity data as discussed. The received signal amplitudes are calibrated with the background reflectivity data in block 306. The difference reflectivity data are calculated in block 308. The difference reflectivity data are approximated using basis functions and the basis functions are used to determine lateral difference impedance in block 310. Lateral impedance of the unknown layer is determined by adding the lateral background impedance to the lateral difference impedance in block 312. The impedance of the determined layer is saved in block 314, mapped in block 316 and is then used as the new "previous" impedance in block 318 for the determination of the impedance of the layer beneath it. For example, the next horizon would be 204 and the unknown layer would be just beneath it. A new background impedance is also obtained by moving a receiver along the borehole of the two wells. The next well points would be 214 and 220. Thus, the apparatus shown in FIG. 4 can be used to determine multiple layers if transmitter and receiver sections 12 and 14 are moved to the next horizon after each iteration.

A different background impedance is needed at each layer and the impedance determined at one layer acts as the estimated layer impedance for the next sequential iteration. Noise is filtered out at each layer and thus is not likely to map itself to lower layers.

Figure 16:
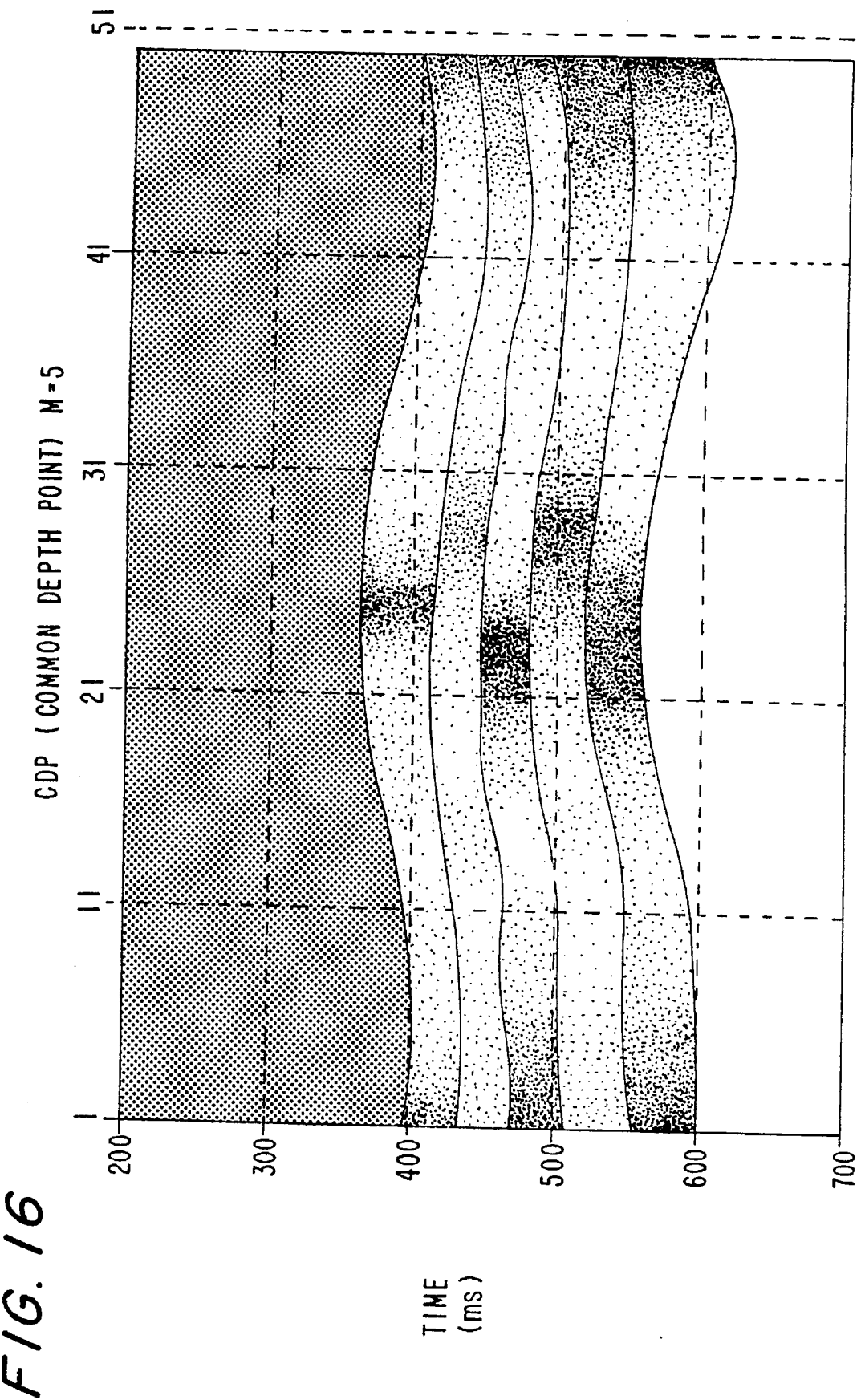

Exemplary results of mapping of lateral impedance of a target zone of multiple layers according to the present invention are shown in FIGS. 12–16. These results are merely illustrative and do not represent actual results. Each of FIGS. 12–15 shows the determination of lateral impedance for a particular layer. FIG. 16 shows lateral impedance for the final layer and the impedance of the entire two dimensional target zone. The dark areas are impedance levels of 20,000 ft/sec * g/cm$^3$ and the light areas are impedance levels of 21,000 ft/sec * g/cm$^3$. The gray areas are values in between these impedance levels.

Figure 17:
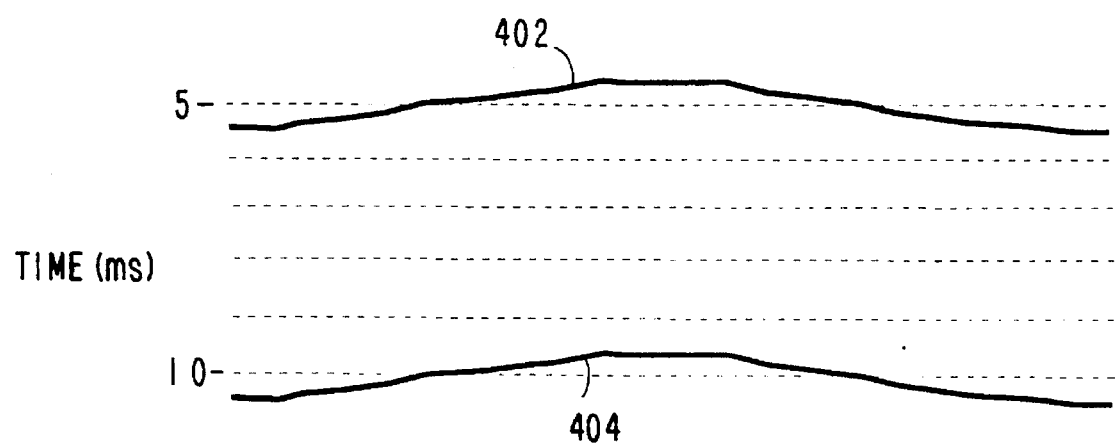
FIG. 17 illustrates the present invention operating in multi-time mode.

Referring to FIG. 17 a time mode embodiment of the present invention will now be described. FIG. 17 shows horizon 402 and 404, and time levels at 5, 6, 7, 8, 9 and 10 milliseconds.

In the previous embodiments of the invention, received signal amplitudes were picked approximately along a horizon or curve of peak amplitude response. In the FIG. 17 embodiment the received signal amplitudes are picked at a particular time level, for example 5 milliseconds in a time mode. The amplitudes are picked, the background reflectivity is subtracted, the difference reflectivity is approximated using basis functions, the difference impedance is determined from the basis functions, and the unknown impedance is determined and mapped from the background impedance plus the difference impedance as in the horizon mode embodiment of the invention. Multiple layers can also be determined and mapped by simply proceeding to the next time level, for example 6 milliseconds and using the just determined impedance as the previous impedance for the next iteration.

The present invention can also be extended to three dimensions. The equations of interest are now of the form:

$$\Delta r(x,y) \cong c(x,y) \sum_{\mu=1}^{N} \sum_{j=1}^{M} \gamma_j^\mu \Phi_j^\mu(x,y) \quad (3)$$

$$\Delta I(x,y) \cong \sum_{\mu=1}^{N} \sum_{j=1}^{M} \gamma_j^\mu \Phi_j^\mu(x,y) \quad (4)$$

The equations were derived in the same manner as the two dimensional case.

It is preferable for the three-dimensional case to use $\{\exp(i\mu x) \exp(ijy)\}$, (i=square root(−1)), for the basis functions $\Phi_j^\mu(x\ y)$, which are a complete and orthogonal set These are general enough to model any variation in the plane (x,y). N and M represent the number of parameters along the x and y directions respectively.

Although, it is preferred that the amplitudes from all the common depth points be used from the seismic data, a representative number may be selected for the mapping method and apparatus of the present invention.

I claim:

1. A method for mapping lateral impedance of a subsurface layer comprising the steps of:

generating seismic data, picking amplitudes along a lateral slice of the seismic data, developing an impedance model that generates values which approximate said picked amplitudes, determining lateral impedance of the subsurface layer from the model, mapping the lateral impedance of the subsurface layer, and producing a visual representation of said lateral impedance.

2. The method of claim 1 wherein the seismic data are two dimensional.

3. The method of claim 2 wherein the amplitudes are picked along a horizon.

4. The method of claim 2 wherein the amplitudes are picked along a time level.

5. The method of claim 1 wherein the seismic data are three dimensional.

6. The method of claim 5 wherein the amplitudes are picked along a horizon.

7. The method of claim 5 wherein the amplitudes are picked along a time level.

8. A method for mapping lateral impedance of an unknown subsurface layer comprising the steps of:

determining lateral background impedance $I_0(x)$ from known impedance data, determining the lateral impedance $I_1(x)$ of a previous subsurface layer above or below the unknown subsurface layer, calculating lateral background reflectivity $r_o(x)$ based on the lateral background impedance $I_0(x)$ and the lateral impedance $I_1(x)$ of the previous subsurface layer, generating seismic data, picking amplitudes along a lateral slice of the seismic data, taking the difference between the picked amplitudes and the lateral background reflectivity to form lateral difference reflectivity data, $\Delta r(x)$, developing an impedance model that generates values which approximate said lateral difference reflectivity data, determining lateral difference impedance $\Delta I(x)$ from the impedance model, adding the lateral difference impedance to the lateral background impedance to determine lateral impedance of the unknown layer, mapping the lateral impedance of the unknown layer, and producing a visual representation of said lateral impedance.

9. The method of claim 8 wherein the seismic data are two dimensional.

10. The method of claim 9 wherein the amplitudes are picked along a horizon.

11. The method of claim 9 wherein the amplitudes are picked along a time level.

12. The method of claim 8 and wherein the seismic data are three dimensional.

13. The method of claim 12 wherein the amplitudes are picked along a horizon.

14. The method of claim 12 and wherein the amplitudes are picked along a time level.

15. The method of claim 9 and wherein the lateral background impedance is determined by interpolating between known impedance data at a plurality of spaced well positions.

16. The method of claim 15 and wherein the lateral impedance of the previous subsurface layer is determined by recursion.

17. The method of claim 8 wherein the method steps are repeated for multiple iterations to determine and map the lateral impedance of multiple layers and wherein the unknown lateral impedance determined during one iteration is used as the lateral impedance of the previous layer for the next iteration.

18. The method of claim 17 wherein the amplitudes are picked along a horizon.

19. The method of claim 17 wherein the amplitudes are picked along a time level.

20. The method of claim 8 further comprising the step of calibrating said picked amplitudes to said lateral background reflectivity, and wherein said step of determining an impedance model comprises the step of determining the coefficients $\gamma_j^\mu$ of basis function $\phi_j^\mu(x)$ such that $$\Delta r(x) \cong c(x) \sum_{\mu=1}^{2} \sum_{j=1}^{M} \gamma_j^\mu \Phi_j^\mu(x),$$

where $c(x)=[1-r_0(x)]/[I_0(x)+I_1(x)]$, and where the step of determining the lateral difference impedance $\Delta I(x)$ comprises the step of determining the lateral difference impedance according to $$\Delta I(x) = \sum_{\mu=1}^{2} \sum_{j=1}^{M} \gamma_j^\mu \Phi_j^\mu(x).$$

21. The method of claim 20 wherein the seismic data are two dimensional and basis function $\phi_j^\mu(x)$ is given by $\sin(jx)$ for $\mu=1$ and $\cos(jx)$ for $\mu=2$.

22. The method of claim 20 wherein the seismic data are three dimensional and basis function $\phi_j^\mu(x)$ is given by $e^{i\mu x} \cdot e^{ijy}$.

23. An apparatus for mapping lateral impedance of an unknown subsurface layer comprising:

means for generating seismic data, means for selecting amplitudes along a lateral slice of the seismic data, means for developing an impedance model that generates values which approximate said selected amplitudes, means for determining lateral impedance of a subsurface layer from the model, means for mapping the lateral impedance, and means for producing a visual representation of said lateral impedance.

24. The apparatus of claim 23 and wherein the means for generating seismic data include acoustic signal sources and receivers.

25. The apparatus of claim 23 and wherein the apparatus is adapted to map a two dimensional subsurface layer.

26. The apparatus of claim 25 and wherein the means for selecting amplitudes selects amplitudes along a horizon.

27. The apparatus of claim 25 and wherein the means for selecting amplitudes selects amplitudes along a time level.

28. The apparatus of claim 23 and wherein the apparatus is adapted to map a three dimensional subsurface layer.

29. The apparatus of claim 28 and wherein the means for selecting amplitudes selects amplitudes along a horizon slice.

30. The apparatus of claim 28 and wherein the means for selecting amplitudes selects amplitudes along a time level.

31. An apparatus for mapping lateral impedance of an unknown subsurface layer comprising:

signal generating means for generating and directing signals into subsurface layers, signal receiving means for receiving signals in the form of seismic data reflected back from the interfaces of subsurface layers, means for generating impedance data at a plurality of spaced well locations, processing means for determining lateral background impedance $I_0(x)$ from the impedance data from the plurality of spaced well locations, processing means for determining an estimate of the lateral impedance $I_1(x)$ of the subsurface layer vertically adjacent the unknown subsurface layer, means for determining lateral background reflectivity $r_0(x)$ from the lateral background impedance $I_0(x)$ and the lateral impedance $I_1(x)$ of the subsurface layer vertically adjacent the unknown subsurface layer, means for determining the difference between amplitudes selected along a lateral slice of the seismic data and the lateral background reflectivity to form lateral difference reflectivity data, $\Delta r(x)$, means for developing an impedance model that generates values which approximate said lateral difference reflectivity data, means for determining the lateral impedance from said impedance model, mapping means for mapping the lateral impedance of the unknown subsurface layer, and means for producing a visual representation of said lateral impedance.

32. The apparatus of claim 31 and wherein the apparatus is adapted to map a two dimensional subsurface layer.

33. The apparatus of claim 32 and wherein the selected amplitudes are selected along a horizon.

34. The apparatus of claim 32 and wherein the selected amplitudes are selected along a time level.

35. The apparatus of claim 31 and wherein the apparatus is adapted to map a three dimensional subsurface layer.

36. The apparatus of claim 35 and wherein the selected amplitudes are selected along a horizon slice.

37. The apparatus of claim 35 and wherein the means for selecting amplitudes selects amplitudes along a time level.

* * * * *